Patented July 18, 1950

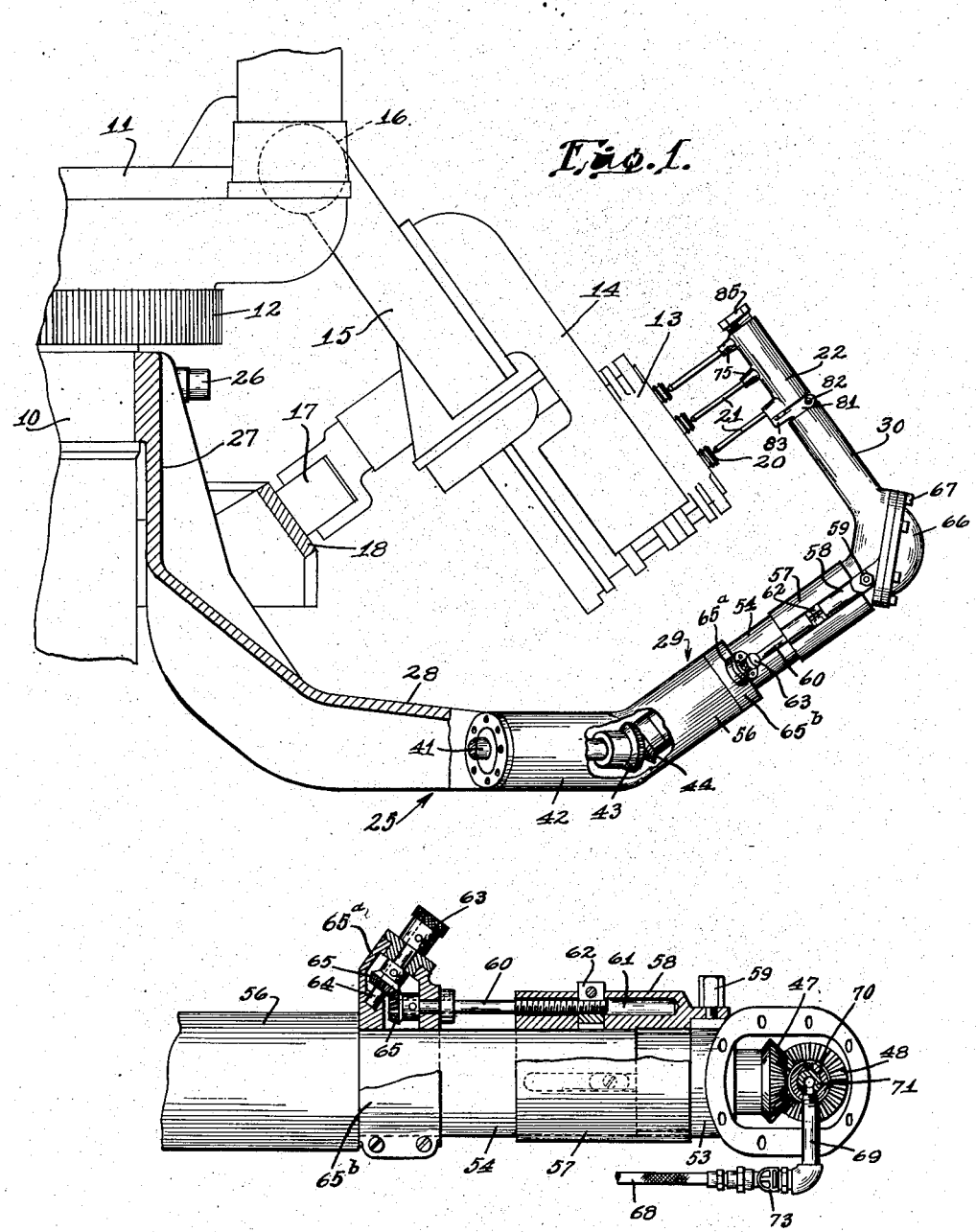

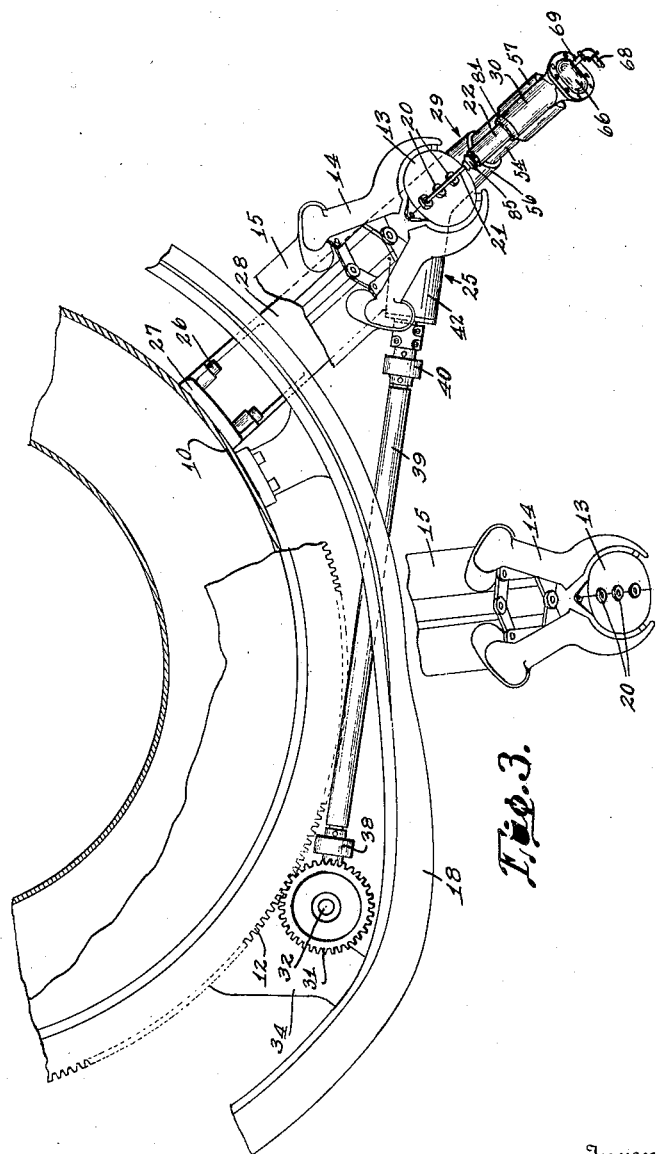

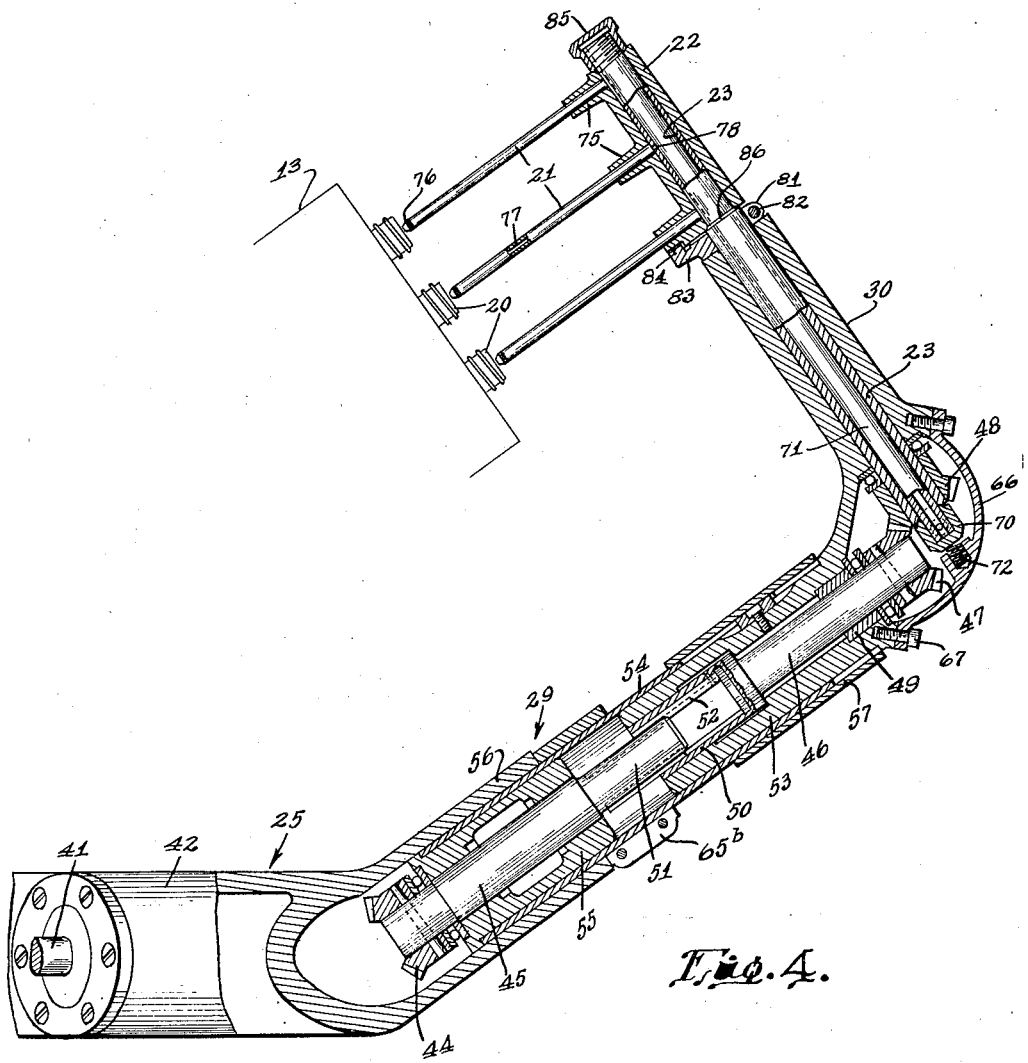

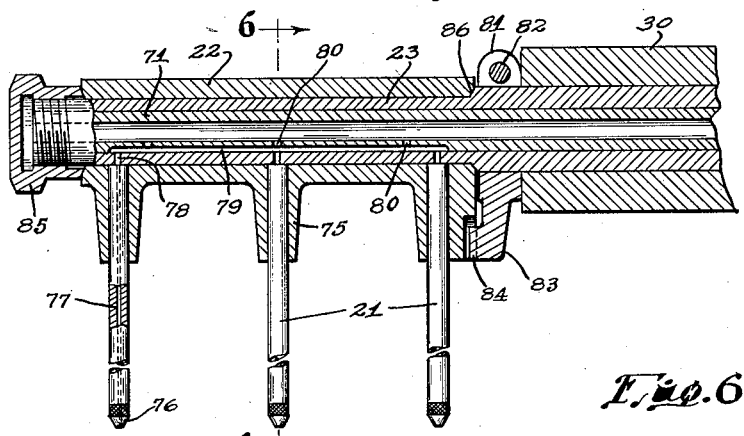
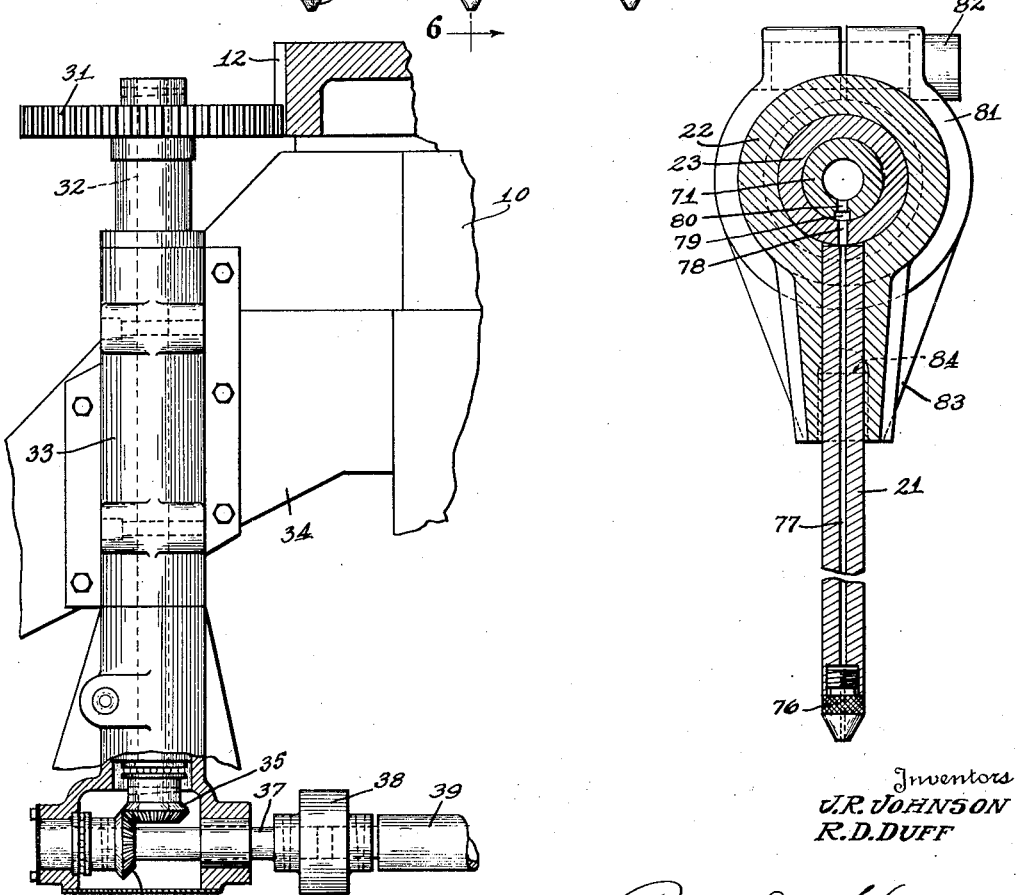

2,515,372

UNITED STATES PATENT OFFICE 2,515,372

GAS TREATING APPARATUS FOR HOLLOW GLASS ARTICLES

John R. Johnson, Alton, and Richard D. Duff, Streator, Ill., assignors to Owens-Illinois Glass Company, a corporation of Ohio Application March 7, 1946, Serial No. 652,706

6 Claims. (Cl. 49—1)

Our invention relates to the treatment of the interior surfaces of glass containers, such as bottles and jars or other hollow glass articles, with a gas or treating substance in a gaseous vehicle for improving such surfaces, and comprises apparatus for injecting the gas into the container while the latter is at a high temperature.

In the manufacture of glass bottles and other containers various methods have been employed for treating the interior surfaces of the containers with an acid substance or reagent for the purpose of neutralizing alkalinity in the surface portion of the glass and thereby improving the interior surface of the container. Such methods include the use of an acidic gas diffused through the atmosphere within the annealing leers in which the containers are annealed, the burning of pellets of sulfur or the like in the hot containers, and other methods. The patent to Burch, 2,154,490, April 18, 1939, Method of Treating Hollow Glass Articles, discloses a method in which an acidic gas is introduced under pressure within the glass article or parison while the latter is enclosed in the blowing mold, during the operation of blowing the parison to finished form.

An object of the present invention is to provide an improved apparatus for injecting an acidic gas such as sulfur dioxide or trioxide into hollow blown glass articles immediately after they have been blown in the finishing mold and while still within the mold and at a high temperature, such operation being subsequent to the final blowing of the article in the mold and after the blowing pressure has been discontinued and the articles opened to the atmosphere.

A further object of the invention is to provide an apparatus by which the glass container may be treated with an acidic gas while within the finish blowing mold, and which method is free from objections incident to the method disclosed in the above mentioned patent wherein the treating gas is introduced through the same pipe as the blowing air and under pressure while the mold is closed to atmospheric pressure.

Other objects of the invention will appear hereinafter.

Referring to the accompanying drawings which illustrate an apparatus for use in practicing our invention:

Fig. 1 is a fragmentary part sectional elevation of a glass blowing machine of the Owens type to which the injecting apparatus is applied;

Fig. 2 is a fragmentary section on a larger scale of a portion of the carrying arm for the injection blowers and showing particularly a mechanism for adjusting the position of the blowers to accommodate them to ware of different lengths;

Fig. 3 is a part sectional plan view of mechanism shown in Fig. 1;

Fig. 4 is a sectional elevation on a comparatively large scale of a portion of the carrying arm;

Fig. 5 is a part sectional view on a still larger scale of the blower head and nozzles;

Fig. 6 is an enlarged section at the line 6—6 on Fig. 5; and

Fig. 7 is a part sectional elevation, with parts broken away, showing a portion of the train of gearing for rotating the blower head.

Referring to Fig. 1, the mechanism for injecting an acid gas or other treating gas within the blown glass articles is shown as an attachment for a glass blowing machine of the Owens type. The machine comprises the stationary base 10 on which is mounted a carriage 11 rotated continuously about a vertical axis by means of a ring gear fixed to the carriage and driven by an electric motor (not shown). The carriage 11 has mounted for rotation therewith an annular series of blowing units, each comprising a blank or parison mold (not shown) in which mold charges of molten glass are introduced and blown to the form of hollow parisons. The parison mold includes a neck mold and a body bold. After the parison is blown, it is transferred while held in the neck mold to a finish blow mold 13 comprising partible sections having link connections with pivoted arms 14 operated by conventional mechanism for opening and closing the finishing mold 13. The arms 14 are supported on a mold carrier frame 15 mounted to swing up and down about a pivot 16. A cam follower roll 17 on the frame 15 runs on a stationary cam track 18 shaped to control the lifting and lowering movements of the frame and mold 13 thereon.

The parts above described and designated by reference numbers are old in the art, being conventional in Owens type machines. For a full disclosure of this type of machine, reference may be had to the above mentioned Burch patent, 2,154,490, or the LaFrance patent, 1,185,687, referred to in the Burch patent, or LaFrance patent, 1,699,566, January 22, 1929, Glass Forming Machine.

The blowing mechanism for injecting a treating gas into the bottles 20 or other hollow glass articles within the mold, includes a series of blowing nozzles 21 attached to a tubular blowing head 22 mounted on a rotary tubular shaft 23 for rotation therewith, the shaft 23 being journalled for rotation on a non-rotatable pipe or tube 71 through which the treating gas is conveyed to the nozzles as hereinafter described. The blowing head and its rotating mechanism are carried by a stationary carrier arm 25 attached to the machine base 10 by means of bolts 26. The arm 25 includes a vertically disposed section 27 extending downwardly from its point of attachment to the machine, a horizontally disposed section 28 extending outwardly from the machine, an upwardly and outwardly inclined section 29, and an upwardly and inwardly inclined section 30.

The blowing head 22 is rotated by the ring gear 12 operating through a train of gearing now to be described. Such gearing includes a spur gear 31 (Figs. 3 and 7) running in mesh with the ring gear 12 and keyed to the upper end of a vertical shaft 32 which is journalled within a vertical tubular housing 33 bolted to an arm 34 on the machine base 10. The lower end of the shaft 32 has keyed thereto a bevelled gear 35 running in mesh with a gear 36 keyed to a horizontal shaft 37, the latter journalled in bearings in the lower end of the member 33. The shaft 37 is connected by a coupling 38 to one end of a horizontally disposed shaft 39, the other end of which is connected by a coupling 40 to a shaft 41 extending lengthwise through a short tubular arm 42 integral with and branching from the section 28 of the carrier arm. The forward end of the shaft 41 has keyed thereto a bevelled gear 43 meshing with a gear 44 keyed to one end of an extensible shaft (Fig. 4) comprising aligned sections 45 and 46, said sections having a telescopic connection as presently described.

The shaft section 46 has keyed to its forward end a miter gear 47 in mesh with a gear 48 secured to one end of the rotary shaft 23 which carries the injection blowing head 22. The shaft section 46 is journalled for rotation in a bushing 49. The inner end portion 50 of the section 46 is of enlarged diameter and tubular and has a telescopic connection with the reduced end portion 51 of the shaft section 45. A spline 52 secured within the extension 50 is slidable lengthwise in a corresponding groove in the part 51, providing a driving connection between the shaft sections 45 and 46 while permitting the length of the shaft to be adjusted.

The inclined section 29 of the carrier arm 25 also includes parts having a telescopic connection, said parts including a tubular bearing block or member 53, formed as an integral extension of the section 30, and telescopic with a sleeve 54 surrounding and fixed to a bearing block 55 in which the shaft section 45 is journalled, said sleeve 54 being fitted within and affixed to a tubular portion 56 of the arm 25. The sleeve 54 telescopes with a surrounding sleeve 57 (Figs. 2 and 4), the sleeve 57 being formed with an integral enlargement or rib 58 and keyed to the carrier arm by a bolt 59.

Means for lengthening and shortening the section 29 of the carrier arm and thereby adjusting the injection head and nozzles toward and from the mold, comprises an adjusting rod 60 (Fig. 2) which extends into a bore 61 in the rib 58 and has a screwthreaded connection with a nut 62 held in said rib. The rod 60 is rotatable manually by means of a knob 63 on a shaft 64 having a driving connection with the shaft 60 through a pair of bevel gears 65. A housing 65$^a$ for the gears 65 is formed on a strap 65$^b$ clamped to the sleeve 54.

Referring to Fig. 4, the carrier arm at the junction of the sections 29 and 30 is formed to provide a housing for the gears 47 and 48, said housing including a hood 66 removably secured to the arm by bolts 67.

The gas for treating the blown glassware is supplied to the blowers or injection nozzles through a gas supply line 68 (Fig. 2) including a pipe section 69 threaded into a cap 70 (Figs. 2 and 4) keyed to the end of the non-rotatable tube 71 which extends lengthwise through the rotatable tubular shaft 23. A coil spring 72 housed in the hood 66 applies an end thrust to the end 70 and tube 71, holding the latter in position to maintain the gas line open at the pipe section 69. A slide valve 73 (Fig. 2) is operable manually to close the gas line.

Referring to Figs. 5 and 6, the head 22 is formed with a row of tubular extensions 75 in which the nozzles 21 are secured. Each nozzle comprises a removable tip 76 and is formed with a bore 77 extending lengthwise therethrough in register with an opening 78 extending through the wall of the tubular shaft 23. The non-rotating tube 71 is formed with a narrow channel 79 extending lengthwise thereof, said channel being in communication with the interior of the tube through ports 80. The bores 77 in the nozzles 21 are periodically opened to the tube 71 by the rotation of the head 22 which brings the ports 78 into register with the channel 79 once during each complete rotation of the head. There is thus provided a valve in said head which automatically opens the gas line to the nozzles. The channel 79 is so located that the nozzles are opened to the gas supply line when they are in register with the open necks or mouths of the containers 20. The head 22 is locked to the shaft 23 for rotation therewith by means of a split collar 81 surrounding the shaft 23 and secured thereto by a clamping bolt 82. The collar is formed with an extension 83 provided with a rib 84 to engage a slot in the head 22 thereby connecting the head 22 for rotation with the shaft 23. The head 22 is held in position lengthwise of the shaft by means of a cap 85 threaded on the end of the shaft 23 and bearing against the head 22 which is thereby clamped between said cap and a shoulder 86 formed on the shaft. By loosening the bolt 82 and cap 85, the injection head 22 may be rotatably adjusted on the shaft 23.

The rotation of the injection head 22 serves primarily as a means for shutting off the flow of gas except while the nozzles are in register with the bottles 20 and automatically supplying gas through the nozzles as the latter are brought to operative position.

The operation may be summarized as follows:

As the mold carriage 11 rotates about its axis the finishing molds 13 are brought in succession into register with the injection mechanism. The injection head 22 having driving connection through the train of gearing with the driving gear 12 on the carriage is rotated in synchronism with the rotary movement of the mold carriage, the gears being proportioned to impart one complete rotation of the injection head about its axis during the travel of the mold carriage through the angular distance between centers of the adjoining mold units. The injection head is so adjusted that the nozzles are directly in line or in register with the neck openings of the containers 20 as the latter pass beneath the nozzles, in which position the nozzles are open to the gas line. The treating gas, for example, sulfur dioxide is supplied to the nozzles under continuous pressure so that an equal quantity of the gas is blown into each container 20 thereby subjecting the interior surfaces of the containers to the action of the gas. As this treatment takes place immediately or very shortly after the articles have been blown to finished form in the mold, the treated surfaces are at a high temperature which is desirable for obtaining a rapid and effective operation of the gas in neutralizing the alkalinity of the surface portion of the glass. The glass is at or above a red heat; temperature at the time of treatment may be 1100° F. or higher. The usual temperatures of blown glass articles in the finishing molds at the time of treating them with the acid gas, namely, just before the mold opens, range from about 1000° F. to 1500° F. The rotation of the head 22 about its axis in addition to controlling the periodic flow of gas also serves to carry the nozzles out of the path of certain parts rotating with the mold carriage, particularly the so-called knockout arms which engage the blown glass articles and control their discharge from the machine when the molds are opened.

Modifications may be resorted to within the spirit and scope of my invention.

We claim:

1. A glass blowing machine comprising a mold carriage, a stationary base on which the carriage is mounted for rotation, a mold mounted to rotate with the carriage, a blowing head mounted separately from the mold carriage, a nozzle connected to said blowing head in position to register with the mouth of a blown article within the mold when the latter reaches a predetermined position during its rotation with the mold carriage, means providing a gas line extending to said head through which gas is supplied through said head and nozzle, interconnected driving mechanism between the mold carriage and said head for rotating the latter about a stationary axis, and valve means operated by the rotation of said head for opening the gas line to the nozzle when the latter is in register with an article within the mold and for cutting off the supply of gas to the nozzle when the latter is out of register with said article.

2. The combination of a mold carriage mounted for rotation about an axis, a mold connected to rotate with the carriage, an injection head mounted separately from the carriage for rotation about a stationary axis, an injection nozzle connected to said head and projecting laterally outward therefrom, interconnected driving mechanism between said head and the mold carriage for rotating said head about its axis in synchronism with the rotary movement of the mold carriage and by which the nozzle is brought into register with the mouth of a blown glass article within the mold, said driving mechanism being timed to bring the nozzle into said position each time the mold passes the said head during its rotation with the carriage, and means for supplying an acid gas under pressure to said head and through the nozzle into a glass article enclosed within the mold.

3. The combination of a mold carriage mounted for rotation about an axis, a mold connected to rotate with the carriage, an injection head mounted separately from the carriage for rotation about a stationary axis, an injection nozzle connected to said head and projecting laterally outward therefrom, interconnected driving mechanism between said head and the mold carriage for rotating said head about its axis in synchronism with the rotary movement of the mold carriage and by which the nozzle is brought into register with the mouth of a blown glass article within the mold, said driving mechanism being timed to bring the nozzle into said position each time the mold passes the said head during its rotation with the carriage, a gas pressure line extending to said head and through which gas under pressure is conveyed to said head and nozzle, and a valve in said line opened and closed by the rotation of said head, said valve being positioned and arranged to be opened when the nozzle registers with a blown glass article within the mold and to be closed when the mold and said article pass beyond the range of the nozzle.

4. A glass blowing machine comprising a mold carriage, a stationary base on which the carriage is mounted for rotation about a vertical axis, a mold carrying arm mounted on the carriage, a mold on said arm in which a parison of glass is blown to form a hollow article, a stationary arm mounted on the machine base and extending outwardly beneath the path of the mold and upwardly to a position adjacent to and over the path of the mold, an injection head mounted on the free end of said stationary arm, injection nozzles carried by said head and projecting outwardly therefrom, said head being mounted for rotation on said stationary arm, a gear train extending from the mold carriage to said head and through which movement is transmitted from the rotating carriage to said head and rotates the latter in synchronism with the rotation of the mold carriage, said nozzles being positioned and arranged to be brought in register with the open ends of articles blown in the mold as the latter passes beneath said head, and means for supplying a gas under pressure to said head and nozzles.

5. Apparatus for blowing a gas into the mouth of a hollow article, comprising an arm including hollow sections extending at substantially right angles to each other, one said section comprising parts relatively movable lengthwise for adjusting the length of said section and thereby adjusting the position of the other section, a rotary blowing head mounted on said other section for rotation, a gear train through which motion is transmitted to said head for rotating the latter, said gear train comprising shafts mounted for rotation within said sections and intermeshing gears connected respectively to said shafts, said blowing head comprising a nozzle, means for supplying a gas under pressure to said head, and valve means for automatically opening and closing the nozzle at predetermined points in the rotation of the blowing head.

6. Blowing apparatus comprising a support, an arm carried by support, said arm including a section extending in an upwardly and outwardly inclined direction from the support and a second section upwardly and inwardly inclined and extending from the outer end of said first mentioned section, said arm being tubular, shafts mounted in said sections and extending lengthwise thereof, intermeshing gears connected to said shafts and forming a driving connection between the shafts, a blowing head carried by said second section and connected to the shaft in said second section for rotation therewith, a nozzle connected to said blowing head and extending radially outward therefrom, a non-rotating pipe extending lengthwise through the shaft in said second section and into said blowing head, means for supplying gas under pressure through said pipe to the blowing head, and valve means for opening and closing the gas line to said nozzle at predetermined points in the rotation of the blowing head.

JOHN R. JOHNSON.
RICHARD D. DUFF.

REFERENCES CITED

The following references are of record in the file of this patent:

UNITED STATES PATENTS

| Number | Name | Date |
|---|---|---|
| 981,768 | Ketterer | Jan. 17, 1911 |
| 1,066,285 | Ketterer | July 1, 1913 |
| 2,154,490 | Burch | Apr. 18, 1939 |
| 2,402,387 | Ferguson | June 18, 1946 |